United States Patent [19]

Gradl et al.

[11] 4,321,245

[45] Mar. 23, 1982

[54] PROCESS FOR THE PURIFICATION OF WET-PROCESSED PHOSPHORIC ACID

[75] Inventors: Reinhard Gradl, Hürth; Klaus Schrödter, Cologne; Klaus-Peter Ehlers, Erftstadt, all of Fed. Rep. of Germany

[73] Assignee: Hoechst Aktiengesellschaft, Fed. Rep. of Germany

[21] Appl. No.: 205,172

[22] Filed: Nov. 10, 1980

[30] Foreign Application Priority Data

Nov. 14, 1979 [DE] Fed. Rep. of Germany ....... 2945874

[51] Int. Cl.$^3$ ............................................. C01B 25/16
[52] U.S. Cl. .............................. 423/321 S; 423/321 R
[58] Field of Search ......................... 423/321 S, 321 R

[56] References Cited

U.S. PATENT DOCUMENTS

| | | | |
|---|---|---|---|
| 3,554,694 | 1/1971 | Barker et al. | 423/321 R |
| 3,607,029 | 9/1971 | Goret et al. | 423/321 S |
| 4,222,994 | 9/1980 | Ehlers et al. | 423/321 S |

FOREIGN PATENT DOCUMENTS

| | | |
|---|---|---|
| 2127141 | 12/1971 | Fed. Rep. of Germany . |
| 2032263 | 1/1973 | Fed. Rep. of Germany . |
| 2429758 | 1/1975 | Fed. Rep. of Germany . |
| 2321751 | 2/1976 | Fed. Rep. of Germany . |
| 2657189 | 6/1978 | Fed. Rep. of Germany . |
| 2704545 | 5/1979 | Fed. Rep. of Germany . |

*Primary Examiner*—O. R. Vertiz
*Assistant Examiner*—Gregory A. Heller
*Attorney, Agent, or Firm*—Connolly and Hutz

[57] ABSTRACT

The invention relates to a process for the purification of wet-processed phosphoric acid with the aid of organic solvents which are immiscible or only partially miscible with water, the sulfate ions being removed by addition of barium compounds. The purification is carried out in an n-stage extraction installation, where n is equal to or greater than 5. The barium compound is added to the phosphoric acid to be purified, and the resulting mixture is fed to the top of the extraction installation, in which the organic solvent phase is dispersed in the aqueous phase. The sulfuric acid is led in counter-current fashion to the phosphoric acid by adding it to one of the stages $n=4$ to at most $n-1$.

3 Claims, No Drawings

PROCESS FOR THE PURIFICATION OF WET-PROCESSED PHOSPHORIC ACID

The present invention relates to a process for the purification of wet-processed phosphoric acid by a multistage counter-current extraction, in the presence of sulfuric acid, with organic solvents which are immiscible or only partially miscible with water, the sulfate ions being removed by addition of barium compounds, which form sparingly soluble precipitates with these ions. The phosphoric acid so purified is then recovered in known manner from the organic phosphoric acid extract, after this latter has been separated from the residue not taken up by the organic phase.

It is known to use both organic solvents which are miscible with water in all proportions, and organic solvents which are immiscible or only partially miscible with water, as solvents for the extractive purification of wet-processed phosphoric acid. Alcohols with 4–8 C-atoms, for example isobutanol or amyl alcohol, are frequently used. These solvents are employed in a water-saturated form (U.S. Pat. No. 3,338,674), a partially water-saturated form (German Offenlegungsschrift No. 2,127,141 and German Offenlegungsschrift No. 2,657,189) or an anhydrous form (German Auslegeschrift No. 2,321,751).

These however are processes wherein the extraction apparatuses are often liable to be subject to encrustation which indeed may considerably handicap commercial operation.

In those cases in which relatively high demands are made relative to the purity of phosphoric acid, for example in the production of foodstuffs or pharmaceutical preparations, it is necessary for the acid to be freed from impurities and more or less substantially from sulfate ions.

For this reason attempts have already been made to treat phosphoric acid with barium salts to remove sulfate. However, in doing so it has been found that the precipitation of barium sulfate under commercial conditions entails considerable difficulties, inasmuch as the precipitate has been found to be separated in fine particulate form from a concentrated solution. For this reason, it is necessary for the phosphoric acid to be diluted prior to the precipitation, and after desulfation, to be evaporated once again, naturally with heavy expenditure of apparatus and costs (cf. German Auslegeschrift No. 2,032,263 and German Auslegeschrift No. 2,429,758).

As described in German Auslegeschrift No. 2,704,545, a barium compound is added to a phosphoric acid which has been purified by extraction with an organic solvent, and the precipitated barium sulfate is separated from the phosphoric acid. In this process, the barium compound is added, to a phosphoric acid of more than 70% strength by weight, in a proportion sufficient to have at least 5 ppm by weight of dissolved sulfate in the phosphoric acid, and the precipitated barium sulfate is separated at a temperature lower than 80° C.

This process is beset with the following substantial disadvantages: It is necessary for the resulting barium sulfate to be filtered off from relatively concentrated acid, which is known to be technically difficult. It is necessary for the barium compound to be added in a stoichiometric deficiency, based on the sulfate concentration, which makes it necessary for the sulfate concentration to be continually measured. This in turn is expensive and, at the very low concentrations involved, is subject to considerable errors. In the case of high initial sulfate levels, the addition of barium must be repeated "several times", and the sulfate concentration which remains must be measured each time, so that continuous conduct of the process becomes very difficult.

Further, according to German Offenlegungsschrift No. 2,429,758, sulfate ions can be precipitated from wet-processed phosphoric acid in a 2-stage process. The sulfate content in the wet-processed phosphoric acid, which initially is as high as 6–8% by weight, is reduced, by addition of calcium compounds, to a content of 0.23% by weight of sulfate. Next, the silicon and fluorine are removed completely. In a subsequent step, the phosphoric acid is extracted with organic solvents. The sulfate ions contained in the extract are precipitated, as barium sulfate, with the use of barium salts. To this end, the mixture of extract and barium compound must be stirred for more than 30 minutes to 2 hours. The slurry containing the barium sulfate precipitate is then fed directly to a washing stage.

Considerable disadvantages encountered with this process are the invariable extremely long reaction time of up to 2 hours and the fact that only a small portion of the barium sulfate precipitate suspended in the organic extract can, on washing, be transferred into the aqueous phase, and accordingly remains predominantly in the organic phase, even during washing. In order to avoid the risk of barium sulfate precipitate passing into the re-extraction stage, and thereby contaminating the purified acid with barium sulfate, it is necessary for the precipitate to be separated, naturally with the consequential difficulties described in the pertinent literature.

In other words, it has not been possible heretofore to reduce or remove the sulfate ions in a simple manner (that is to say, without an additional processing step and in particular without filtration) as early as during, and simultaneously with, the extraction of wet-processed phosphoric acid with an organic solvent.

It is therefore the object of the invention or provide a process for the purification of wet-processed phosphoric acid under conditions which provide
  (a) for the sulfate ions to be effectively removed as early as during the extraction;
  (b) for the sulfate ions to be removed without the need to use an additional process step and, more particularly a filtration step;
  (c) for the recovery of an optimum amount of $P_2O_5$; and
  (d) for avoidance of encrustation during crystallization by compounds crystallizing out.

The present invention now unexpectedly provides a process permitting wet-processed phosphoric acid to be purified by multi-stage counter-current extraction in the presence of sulfuric acid, with the aid of organic solvents which are immiscible or only partially miscible with water, under specific conditions, permitting the sulfate ions to be removed by addition of barium compounds which form sparingly soluble precipitate with these ions, the phosphoric acid being recovered from the separated-off organic extract.

These conditions provide:
  (a) for the purification to be carried out in an n-stage extraction installation, where n is equal to or greater than 5, and is preferably 5–10;

(b) for the barium compound to be added to the phosphoric acid to be purified, and for the resulting mixture to be fed to the head of the extraction installation;

(c) for the organic solvent phase to be dispersed in the aqueous phase; and (d) for the sulfuric acid to be conducted countercurrently with respect to the phosphoric acid, by adding it to one of the stages $n=4$ to $n-1$.

It is preferable in accordance with this invention to use organic solvents which have 5 carbon atoms and are anhydrous, partially water-saturated or completely water-saturated, and wet-processed phosphoric acid solutions which have $P_2O_5$ contents of 40–55% by weight. The sulfuric acid should preferably be added in a concentrated form and in a proportion of 2–20% by weight, based on the phosphoric acid, calculated as $P_2O_5$. The quantity of solvent needed depends on the water content of the solvent and on the $P_2O_5$ concentration of the contaminated wet-processed phosphoric acid. The quantity of solvent added increases with decreasing $P_2O_5$ concentration of the acid and with increasing water content of the solvent. Thus, for example in those cases in which an anhydrous $C_5$-alcohol is used as the solvent and in which the acid contains 40–55% by weight $P_2O_5$, it is good practice to use 5.5–2.5 parts by volume of alcohol per part by volume of acid. In those cases in which a water-saturated alcohol is used, it is good practice to use a 40–55% strength acid and 6.0–8.2 parts by volume of alcohol per volume of acid. The extraction can be carried out at temperatures between 0° and 98° C., preferably between 20° and 50° C. Barium compounds, suitable for use in the process of this invention comprise barium carbonate, barium hydroxide, barium phosphate, barium chloride, barium nitrate and the like.

The preferred compounds comprise barium carbonate, barium hydroxide and barium phosphate which avoid contamination by anions.

The barium compound can be employed in a solid form or in aqueous solution or in phosphoric acid solution. It is added to the crude phosphoric acid to be extracted prior to the actual extraction. Advantageously, the barium compound is added to the aqueous phosphoric acid solution which is obtained when the organic phosphoric acid solution is washed with water in a known manner to remove the cationic impurities. This so-called wash raffinate can either be fed directly, together with the barium compound, into the first stage of the extraction unit, or can first be mixed with the phosphoric acid to be extracted. The amount of barium compound added depends on the content of sulfate ions in the phosphoric acid to be extracted, on the amount of sulfuric acid added as an extraction auxiliary, and on the sulfate concentration desired in the purified phosphoric acid.

Preferably, the sulfate ion concentration in the aqueous phase and in the organic phase is determined, in the first stage of the extraction apparatus, before the barium compound is added, and the barium compound is added in the stoichiometric proportion or in less than the stoichiometric proportion, depending on the sulfate ion concentration desired.

In this way, practically any desired sulfate ion concentration, down to about 10 ppm, can be established in the concentrated and purified acid.

According to the invention, the extraction is carried out by dispersing the organic solvent phase in the aqueous phase.

This type of dispersion is necessary to ensure that the barium sulfate precipitate remains dispersed in the aqueous phase. Failing this, substantial proportions of barium sulfate crystals pass into the organic phase, so that mechanical separation would become necessary as an additional processing step, involving generally accepted difficulties.

As a result of the type of dispersion employed according to the invention, the following additional advantages are achieved:

(a) the sulfate content and barium concentration in the extract phase, and hence in the purified acid, are substantially lower than in customary inversed dispersions, i.e. the dispersion of the aqueous phase in the organic phase as the continuous phase;

(b) the dispersion in accordance with this invention produces $P_2O_5$ yields higher than in conventional methods.

The dispersion according to the invention is effected by employing a multi-stage extraction installation, of which the individual stages comprise mixing zones and separation zones. At the beginning of the extraction, the mixing zones are filled with aqueous phase, and during the extraction, the organic phase and aqueous phase are continuously fed to the extraction zones in a volume ratio of at least 2.5:1, and preferably 4:1 to 8:1, and in a total amount sufficient to produce and maintain, in the mixing zones of the individual stages, a volume ratio of organic phase to aqueous phase of at most 1:1, and preferably of 4:6 to 2:8.

The fundamental idea underlying the present extraction process is as follows: The crude phosphoric acid to be extracted is admixed, prior to extracting it, with a barium compound to cause precipitation of sulfate ions, the resulting barium sulfate precipitate is left unseparated and kept suspended in the aqueous phase during the extraction step, and is separated with the aqueous extraction residue, termed raffinate, containing the remaining impurities.

Although the precipitation of sulfate ions from concentrated crude acids by means of barium compounds has long been held in the art to be very difficult, the fact remains that it is easy to achieve by the process according to the invention, which produces the following additional advantages:

(a) the sulfate content of the purified acid can be "regulated", to suit the particular end use, by varying the amount of barium added;

(b) no additional process step for separating the barium sulfate precipitate is necessary;

(c) the yield of $P_2O_5$ is very high;

(d) the contamination of the purified acid with barium is extremely low; and (e) the apparatus remains free from encrustation.

As a result of the barium sulfate precipitate, sufficient solid nuclei are present in the suspension. Any solid matter which may be formed in addition to the barium sulfate remains suspended in the aqueous phase and can be discharged together with the reaffinate.

The process will now be described in more detail with reference to the following Examples. Needless to say, the process of this invention is not limited thereto.

EXAMPLES 1-6

A commercial crude phosphoric acid produced from Morocco phosphate contained 47.5% by weight of $P_2O_5$ and the following principal impurities, based on $P_2O_5$: iron 5,700 ppm, sulfate 0.61%.

In a series of tests, 1 liter/h of this acid together with 250 ml/h of recirculated scrubbing solution was extracted, in an 8-stage countercurrent apparatus, with 6 liters of pure water-saturated n-amyl alcohol, the aqueous phase being introduced into the mixing zone and the organic phase being dispersed therein.

66 ml/h of concentrated sulfuric acid were metered into the mixer of the 7th stage.

Prior to extraction, different amounts of barium compound were added to the crude phosphoric acid.

Listed in the following Table are the sulfate concentrations determined, depending on the quantity added, for the purified phosphoric acid concentrated by evaporation to 60% by weight of $P_2O_5$, and the $P_2O_5$ yield achieved in each experiment.

TABLE 1

| Example No. | 1* | 2 | 3 | 4 | 5 | 6 |
|---|---|---|---|---|---|---|
| Barium carbonate added [%/$P_2O_5$] to the feed | 0 | 0.7 | 1.4 | 1.9 | 2.8 | 3.85 |
| Sulfate content in the pure acid [ppm] | 3100 | 1500 | 500 | 280 | 32 | 9 |
| Yield of $P_2O_5$ [%] | 97.4 | 97.2 | 96.9 | 97.0 | 96.5 | 96. |

* = comparative example

EXAMPLES 7-9

Crude phosphoric acid obtained from Morocco phosphate, but the same as that employed in Examples 1 to 6 save that it contained 1.2% by weight sulfate, based on $P_2O_5$, was used and extracted with hydrous amyl alcohol. 18.3% by weight of sulfuric acid, based on crude $P_2O_5$ was used in countercurrent fashion.

Two experiments were carried out under completely identical experimental conditions save that the aqueous phase was employed once continuously and the organic phase was dispersed therein (see Example 7 in Table 2; type of dispersion: ac-od) whilst in the other case (Example 8) the converse procedure was employed (ad-oc, i.e. aqueous phase dispersed-organic phase continuous); the values shown below were obtained. The values listed under Example 9 were obtained on carrying out the dispersion according to the invention, but without addition of barium carbonate (comparative Example).

TABLE 2

| Example No. | 7 | 8 | 9 |
|---|---|---|---|
| Barium carbonate added %/$P_2O_5$ | 2.76 | 2.76 | 0 |
| Type of dispersion | ac-od | ad-ac | ac-od |
| Sulfate content in the pure acid ppm | 0.10 | 0.22 | 0.51 |
| Barium content in the pure acid ppm | <1 | 10 | — |
| Yield of $P_2O_5$ % | 97.2 | 96.1 | 97.3 |

We claim:

1. In the process for the purification of aqueous wet-processed phosphoric acid in the presence of sulfuric acid by passing counter-currently the said phosphoric acid and organic solvents which are immiscible or only partially miscible with water through a multi-stage extraction installation; adding barium compounds, which form sparingly soluble precipitates with sulfate ions to remove these ions; separating an organic solvent phase and an aqueous phase being formed and recovering from the separated organic solvent phase the purified phosphoric acid: the improvement which comprises
   (a) carrying out the said purification process in an n-stage extraction installation wherein n is an integer greater than 4;
   (b) feeding the phosphoric acid to be purified into the first extraction stage;
   (c) feeding the organic solvent into the last extraction stage n and the sulfuric acid counter-currently to the phosphoric acid into one of the stages having an integer less than n;
   (d) adding the barium compound premixed or simultaneously with the phosphoric acid to the first extraction stage and
   (e) dispersing within the extraction stages the organic solvent phase in the aqueous phase.

2. Process as claimed in claim 1, wherein the purification is carried out in an extraction installation where the number of stages n is 5 to 10.

3. A process as claimed in claim 1, wherein the sulfuric acid is added in a proportion of 2 to 20% by weight, based on the phosphoric acid, calculated as $P_2O_5$.

* * * * *